US011865680B2

(12) United States Patent
Camille

(10) Patent No.: US 11,865,680 B2
(45) Date of Patent: Jan. 9, 2024

(54) CLUTCH BRAKE REMOVAL APPARATUS

(71) Applicant: Micheal Shane Camille, Kamloops (CA)

(72) Inventor: Micheal Shane Camille, Kamloops (CA)

( * ) Notice: Subject to any disclaimer, the term of this patent is extended or adjusted under 35 U.S.C. 154(b) by 784 days.

(21) Appl. No.: 16/888,834

(22) Filed: May 31, 2020

(65) Prior Publication Data

US 2021/0370486 A1 Dec. 2, 2021

(51) Int. Cl.
*B25B 27/00* (2006.01)
*B25D 3/00* (2006.01)
*B25G 1/10* (2006.01)

(52) U.S. Cl.
CPC ............ *B25B 27/0064* (2013.01); *B25D 3/00* (2013.01); *B25G 1/10* (2013.01); *B25D 2250/055* (2013.01); *B25D 2250/155* (2013.01)

(58) Field of Classification Search
CPC ....... B25B 27/0064; B25B 17/02; B25G 1/10; B25D 3/00
See application file for complete search history.

(56) References Cited

U.S. PATENT DOCUMENTS 3,000,097 A * 9/1961 Hartz ....................... B25D 3/00 83/13
4,092,770 A 6/1978 Polashak
4,586,496 A * 5/1986 Keller ....................... B25D 3/00 30/167
4,656,715 A 4/1987 Diaz
5,003,680 A * 4/1991 Vesely .................. B60T 17/221 29/227
5,295,291 A 3/1994 Harris
6,564,679 B1 5/2003 Llamas et al.
7,287,309 B2 10/2007 Brazil
8,464,413 B1 * 6/2013 Prater ..................... B25B 27/02 29/244
10,245,654 B2 * 4/2019 Craychee ............ B25B 27/0064
2005/0217031 A1 10/2005 Carlson
2020/0384623 A1 * 12/2020 Balleste Izuzquiza ...................... B25B 27/0042
2021/0252674 A1 * 8/2021 Stuart ..................... B25B 27/04

* cited by examiner

*Primary Examiner* — Seahee Hong
(74) *Attorney, Agent, or Firm* — Orin Del Vecchio

(57) ABSTRACT

A clutch brake removal tool configured to facilitate the removal of a single piece clutch brake from an input shaft. The clutch brake removal tool includes a rectangular shaped body having a plurality of walls forming a hollow interior volume. The body includes a first sidewall and a second sidewall and further includes a first end and a second end. The body has an opening at the second end providing access to the interior volume. The second end of the body has a leading edge wherein the leading edge is formed in a semicircular shaft so as to mateably abut against an input shaft. The first sidewall includes a first slot formed therein wherein the second end of the first slot is contiguous with the opening of the body. The second sidewall includes a second slot formed identical to the first slot and located on the opposing sidewall.

6 Claims, 2 Drawing Sheets

CLUTCH BRAKE REMOVAL APPARATUS

FIELD OF THE INVENTION

The present invention relates generally to repair tools for vehicles, more specifically but not by way of limitation an apparatus structured to assist in the removal of a single piece clutch brake from an input shaft by facilitating the fracturing of the clutch brake.

BACKGROUND

Most manual transmission equipped vehicles use a system of toothed, rotating plates called synchronizers to ease shifting when the driver fails to perfectly match RPM. The biggest problem with synchronizers is that they see a lot of wear and so are not suitable for high-torque or high-powered applications. Manufacturer of these types of equipment often install non-synchronized transmissions in their products, assuming the operator will be capable of shifting without the synchronizer's mechanical assistance. A vehicle operator can match RPMs to eschew the clutch entirely, even the most experienced operator can't force a moving input shaft to engage a stationary drive gear without synchronization. As such, there must be some way to stop the clutch from spinning with its own inertia when engaging first gear, which is where clutch brakes provide their intended functionality.

Vehicles that start and stop a significant amount often experience premature clutch brake failure. Worn clutch brakes can force the driver to force the transmission into first, which is the leading cause of first-gear failure in these applications. The purpose of a clutch brake is to stop or slow the input shaft from rotating, allowing the gears to mesh without grinding. This eliminates damage to non-synchronized transmissions, and minimizes the effort required when shifting from neutral into first or reverse from a standstill. Clutch brakes usually resemble either drum brakes or automotive clutches. When the driver pushes the clutch pedal all the way to the floor, the clutch brake engages to stop the transmission input shaft from turning. Either stock or aftermarket clutch brakes can be operated by an electrical, hydraulic or pneumatic system, but most are simply attached to the stock clutch assembly and utilize factory hardware for engagement. Clutch brakes are manufactured in various styles from hinged to solid, i.e. a two-piece clutch brake or a one-piece clutch brake. For the latter, removal thereof during maintenance can be quite difficult and labor intensive.

It is intended within the scope of the present invention to provide a clutch brake removal tool that is configured to provide removal of a one piece clutch brake from an input shaft.

SUMMARY OF THE INVENTION

It is the object of the present invention to provide a clutch brake removal apparatus that is configured to facilitate removal of a one-piece clutch brake from an input shaft wherein the apparatus is configured to be operably coupled to an air hammer.

Another object of the present invention is to provide a tool operable to assist in the removal of a one-piece clutch brake from an input shaft wherein the tool of the present invention includes a body having a plurality of walls and an end wall configured to define an interior volume.

A further object of the present invention is to provide a clutch brake removal apparatus that is configured to facilitate removal of a one-piece clutch brake from an input shaft wherein the body of the present invention includes a first end and a second end.

Still another object of the present invention is to provide a tool operable to assist in the removal of a one-piece clutch brake from an input shaft wherein the second end is semi-circular in form so as to be placed mateably adjacent to an input shaft.

An additional object of the present invention is to provide a clutch brake removal apparatus that is configured to facilitate removal of a one-piece clutch brake from an input shaft wherein the body includes opposing sidewalls wherein the sidewalls include slots formed therein.

Yet a further object of the present invention is to provide a tool operable to assist in the removal of a one-piece clutch brake from an input shaft wherein the interior volume of the body is configured to receive a chisel therein wherein the chisel is operably coupled to an air hammer.

Another object of the present invention is to provide a clutch brake removal apparatus that is configured to facilitate removal of a one-piece clutch brake from an input shaft wherein the slots in the opposing sidewalls include chisel accommodation formations so as to facilitate the ability for a chisel disposed within the interior volume of the body to rotate.

An alternate object of the present invention is to provide a tool operable to assist in the removal of a one-piece clutch brake from an input shaft wherein the body further includes an integral handle formed thereon.

Still a further object of the present invention is to provide a clutch brake removal apparatus that is configured to facilitate removal of a one-piece clutch brake from an input shaft wherein the chisel further includes indicia thereon for indicating proper placement within the body.

A further object of the present invention is to provide a tool operable to assist in the removal of a one-piece clutch brake from an input shaft wherein the tool of the present invention is configured to fracture the one-piece clutch brake so as to provide removal thereof.

An alternative objective of the present invention is to provide a clutch brake removal apparatus that is configured to facilitate removal of a one-piece clutch brake from an input shaft wherein the handle is L-shaped.

Another object of the present invention is to provide a tool operable to assist in the removal of a one-piece clutch brake from an input shaft wherein the end wall includes an aperture so as to allow the shaft of the chisel to be journaled therethrough.

To the accomplishment of the above and related objects the present invention may be embodied in the form illustrated in the accompanying drawings. Attention is called to the fact that the drawings are illustrative only. Variations are contemplated as being a part of the present invention, limited only by the scope of the claims.

BRIEF DESCRIPTION OF THE DRAWINGS

A more complete understanding of the present invention may be had by reference to the following Detailed Description and appended claims when taken in conjunction with the accompanying Drawings wherein:

DETAILED DESCRIPTION

Figure 1:
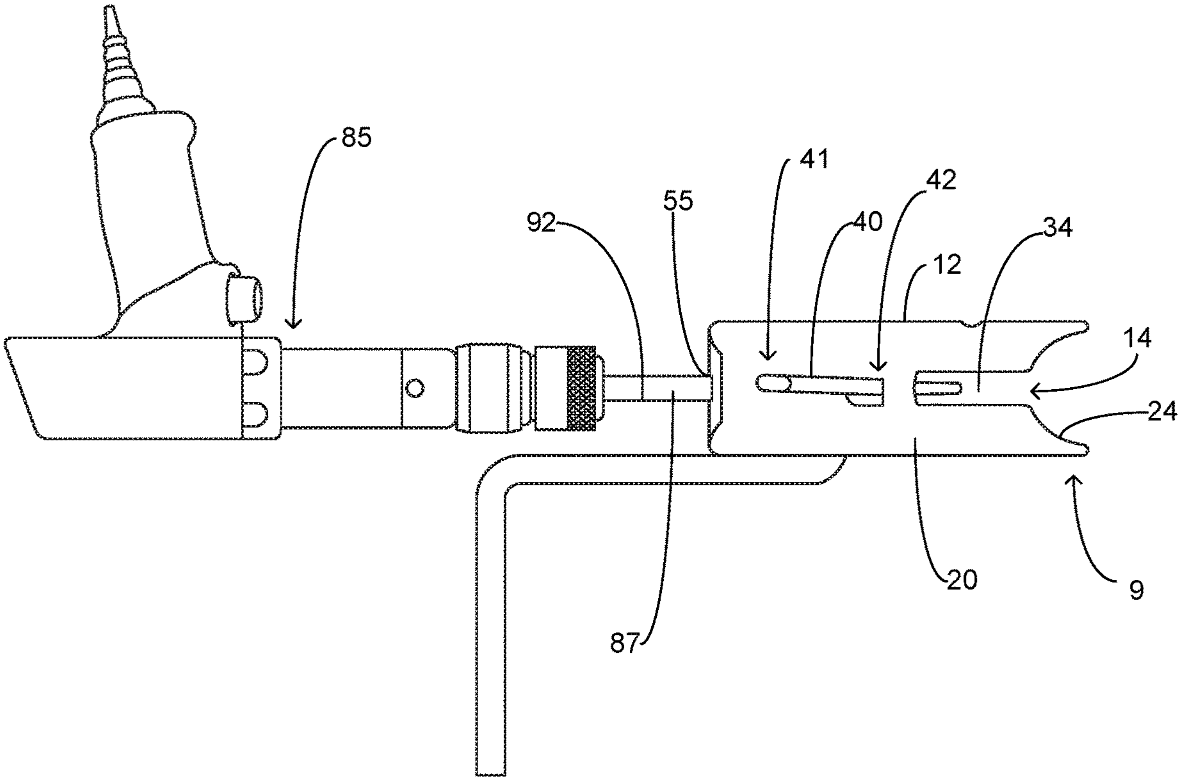
FIG. 1 is a side view of the present invention operably coupled to an air hammer.

References now to the drawings submitted herewith, wherein various elements depicted therein are not necessarily drawn to scale and wherein through the views and figures like elements are referenced with identical reference numerals, there is illustrated a clutch brake removal apparatus 100 constructed according to the principles of the present invention.

An embodiment of the present invention is discussed herein with reference to the figures submitted herewith. Those skilled in the art will understand that the detailed description herein with respect to these figures is for explanatory purposes and that it is contemplated within the scope of the present invention that alternative embodiments are plausible. By way of example but not by way of limitation, those having skill in the art in light of the present teachings of the present invention will recognize a plurality of alternate and suitable approaches dependent upon the needs of the particular application to implement the functionality of any given detail described herein, beyond that of the particular implementation choices in the embodiment described herein. Various modifications and embodiments are within the scope of the present invention.

It is to be further understood that the present invention is not limited to the particular methodology, materials, uses and applications described herein, as these may vary. Furthermore, it is also to be understood that the terminology used herein is used for the purpose of describing particular embodiments only, and is not intended to limit the scope of the present invention. It must be noted that as used herein and in the claims, the singular forms "a", "an" and "the" include the plural reference unless the context clearly dictates otherwise. Thus, for example, a reference to "an element" is a reference to one or more elements and includes equivalents thereof known to those skilled in the art. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

References to "one embodiment", "an embodiment", "exemplary embodiments", and the like may indicate that the embodiment(s) of the invention so described may include a particular feature, structure or characteristic, but not every embodiment necessarily includes the particular feature, structure or characteristic.

Now referring to the Drawings submitted as a part hereof, the clutch brake removal apparatus 100 includes a body 10. The body 10 is hollow and includes a plurality of walls 12 integrally formed to create an interior volume 14. The body 10 further includes a first end 8 and a second end 9. In a preferred embodiment the body 10 is rectangular in shape but it should be understood within the scope of the present invention that the body 10 could be formed in alternate shapes and achieve the desired objective described herein. The body 10 is manufactured from a durable rigid material such as but not limited to metal. The body 10 includes opposing sidewalls 20,22 that are identical in shape.

Figure 3:
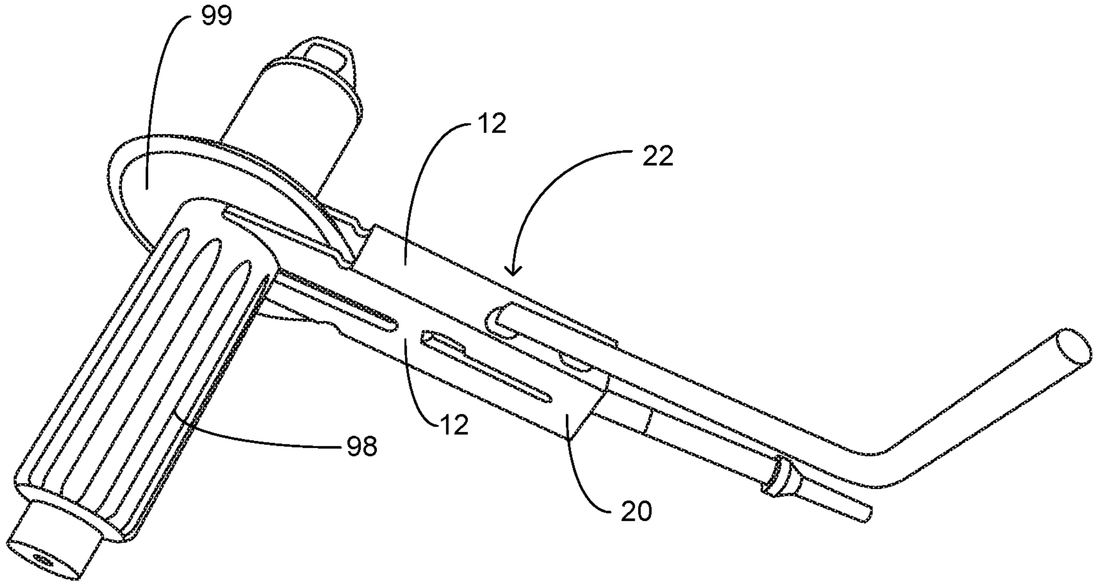
FIG. 3 is a perspective view of the present invention engaged with an exemplary clutch brake and input shaft.

The opposing sidewalls 20, 22 include a leading edge 24 proximate second end 9 of the body 10. The leading edge 24 of the second end 9 is semicircular in shape. As discussed herein and illustrated in FIG. 3, the leading edge 24 is configured to be operably coupled with an input shaft 98 during removal of an exemplary clutch brake 99. The leading edge 24 is formed to a radius that will match that of the input shaft 98 so as to be operably coupled thereto during removal of the clutch brake 99. It should be understood within the scope of the present invention that the leading edge 24 could be formed in either an alternate radius or an alternate shape so as to mateably engage the input shaft 98.

Each opposing sidewall 20,22 has a first slot 30 formed therein. The first slot 30 includes a first end 31 and second end 32. The second end 32 includes opening 33 wherein the opening 33 is contiguous with the hollow passage 34 of the first slot 30. The first slot 30 is formed to provide clearance for the movement of the chisel 88 operably disposed within the interior volume 14 of the body 10. As is further discussed herein the chisel 88 is coupled to an exemplary air hammer 85 wherein the air hammer 85 drives the chisel 88 so as to fracture the clutch brake 99 so as to effect the removal from the input shaft 98. A first slot 30 is formed in each of the opposing sidewalls 20,22 and is identical in form and shape. It should be understood within the scope of the present invention that the first slot 30 could be formed in alternate shapes and sizes in order to accommodate the objective described herein.

Figure 2:
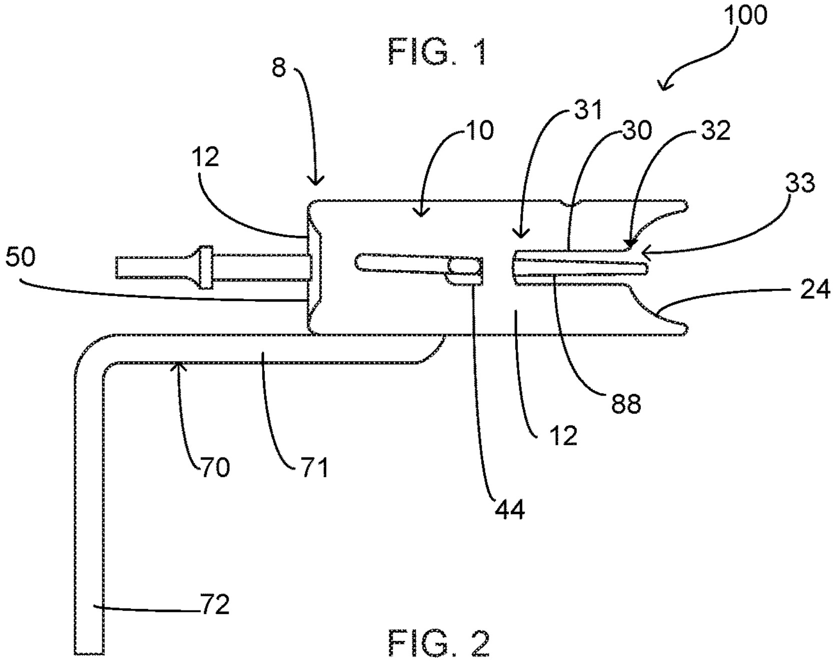
FIG. 2 is a side view of the present invention.

The body 10 further includes a second slot 40 formed therein, the second slot 40 is formed in each of the opposing sidewalls 20,22 and is intermediate the first slot 30 and first end 8 of the body 10. The second slot 40 includes a first end 41 and second end 42. The second slot 40 includes a chisel accommodation formation 44 at the second end 42 of the second slot 40. The chisel accommodation formation 44 is provided to facilitate the rotational movement of the chisel 88 and further assist in the ability of the removal thereof from the clutch brake removal apparatus 100. The chisel accommodation formation 44 is formed in each second slot 40 wherein the chisel accommodation formation 44 has width that is greater than that of the second slot 40. While not particularly illustrated herein, the chisel accommodation formation 44 in the second slot 40 is formed wherein the shape thereof on the opposing sidewalls 20, 22 extends in opposite directions. By way of example, while not specifically illustrated herein, in FIG. 2 herein, the chisel accommodation formation 44 is notched into the second slot 40 so as to extend downward, the second slot 40 of the opposing sidewall (not illustrated in FIG. 2) has a chisel accommodation formation that is formed wherein the notch style shape extends upward. The aforementioned opposing directional shapes of the chisel accommodation formation 44 provide the ability for a user to remove the chisel 88 and further facilitate the clearance for the chisel 88 to be rotated during activation by the air hammer 85.

The end wall 50 is intermediate the opposing sidewalls 20,22 located at first end 8. End wall 50 is integrally formed intermediate the opposing sidewalls 20,22 utilizing suitable durable techniques. The end wall 50 has aperture 55 formed therein. The aperture 55 is annular in shape and operable to have a portion of the shaft 87 of the chisel 88 journaled therethrough. It should be understood within the scope of the present invention that the aperture 55 could be formed in various sizes so as to accommodate the shaft 87 therethrough.

The clutch brake removal apparatus 100 further includes a gripping member 70. The gripping member 70 is secured to the body 10 utilizing suitable durable techniques. The gripping member 70 comprises a first section 71 and second section 72 that are contiguously formed. The first section 71 and second section 72 are perpendicular in manner. The gripping member 70 provides the necessary structure for a user of the clutch brake removal apparatus 100 to bias the body 10 against the input shaft 98 and hold in place when the chisel 88 is in an operational mode from the air hammer 85 and as such engaging the clutch brake 99. While the gripping member 70 is illustrated in a form and shape herein, it is contemplated within the present invention that the gripping member 70 could be formed in alternate shapes and sizes and still achieve the desired objective discussed herein.

The shaft 87 of the chisel 88 includes indicia mark 92 thereon. The indicia mark 92 is present so as to the provide indication how far the chisel can be advanced forward towards the clutch brake 99 without hitting the input shaft 98. It should be understood within the scope of the present invention that the indicia mark 92 could be imprinted or engraved on the shaft 87.

While the preferred embodiment of the present invention includes a first slot 30 and a second slot 40, it is contemplated within the scope of the present invention that a single slot could be formed in each of the opposing sidewalls 20,22 and provide the functionality of the first slot 30 and second slot 40 described herein.

In the preceding detailed description, reference has been made to the accompanying drawings that form a part hereof, and in which are shown by way of illustration specific embodiments in which the invention may be practiced. These embodiments, and certain variants thereof, have been described in sufficient detail to enable those skilled in the art to practice the invention. It is to be understood that other suitable embodiments may be utilized and that logical changes may be made without departing from the spirit or scope of the invention. The description may omit certain information known to those skilled in the art. The preceding description is, therefore, not intended to be limited to the specific forms set forth herein, but on the contrary, it is intended to cover such alternatives, modifications, and equivalents, as can be reasonably included within the spirit and scope of the invention.

What is claimed is:

1. A clutch brake removal tool configured to surroundably mount a clutch brake installed on an input shaft wherein the clutch brake removal tool comprises:

a body, said body having a plurality of walls being integrally formed to create an interior volume, said body having a first end and a second end, said body having an opening at said second end, said opening at said second end providing access to the interior volume of said body, said second end of said body having a leading edge, said leading edge being semicircular in form, said leading edge having a radius formed to be similar to that of a radius of the input shaft so as to mateable abut thereagainst, said plurality of walls further including a first sidewall and a second sidewall, said first sidewall and said second sidewall being on opposing sides of said body and said plurality of walls of said body further include an end wall, said end wall being in between said first sidewall and said second sidewall, said end wall being located at said first end of said body, said end wall having an aperture formed therein;

a first slot and a second slot, said first slot being formed in said first sidewall of said body, said second slot being formed in said second sidewall of said body, each of said first slot and said second slot having a first end and a second end, said second end of said first slot and said second slot having an opening being contiguous with said leading edge;

a third slot, said third slot being formed in said first sidewall, said third slot being intermediate said first slot and said end wall;

a chisel, said chisel being disposed in said interior volume of said body, said chisel having a shaft wherein the shaft has a portion thereof journaled through said aperture of said end wall; and wherein said third slot further includes a chisel accommodation formation, said chisel accommodation having a width that is greater than the third slot, said chisel accommodation formation being located an end of said third slot towards said second end of said body.

2. The clutch brake removal tool as recited in claim 1, and further including a fourth slot, said fourth slot being formed in said second sidewall, said fourth slot being intermediate said second slot and said end wall.

3. The clutch brake removal tool as recited in claim 2, and further including a gripping member, said gripping member having a first section and a second section, said first section and said second section being contiguously formed, said second section being perpendicular to said first section, said first section being adjacent to said body.

4. The clutch brake removal tool as recited in claim 3, wherein said fourth slot further includes a chisel accommodation formation, said chisel accommodation of said fourth slot having a width that is greater than the fourth slot, said chisel accommodation formation of said fourth slot being located at an end of said fourth slot towards said second end of said body.

5. The clutch brake removal tool as recited in claim 4, wherein said shaft of said chisel further includes an indicia mark, said indicia mark operable to monitor a depth of the chisel.

6. The clutch brake removal tool as recited in claim 5, wherein said body is rectangular in shape.

* * * * *